United States Patent
Baccigotti et al.

(10) Patent No.: US 7,099,101 B2
(45) Date of Patent: Aug. 29, 2006

(54) APPARATUS, SYSTEM, AND METHOD FOR DETERMINING CONTACT WITH A MAGNETIC HEAD IN A TAPE DRIVE

(75) Inventors: Marco Dondi Baccigotti, Jalisco (MX); Alex Chliwnyj, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/978,506

(22) Filed: Nov. 1, 2004

(65) Prior Publication Data
US 2006/0092546 A1      May 4, 2006

(51) Int. Cl.
*G11B 15/18* (2006.01)

(52) U.S. Cl. ...................................................... 360/69
(58) Field of Classification Search ................ 360/69, 360/75, 62, 64, 73.05, 78.09, 95, 291.2; 242/338, 242/335; 318/7; 324/212; 348/107
See application file for complete search history.

(56) References Cited

U.S. PATENT DOCUMENTS

| | | | |
|---|---|---|---|
| 3,702,906 A | 11/1972 | Camras | 179/100.2 D |
| 3,705,272 A * | 12/1972 | Tsuji et al. | 360/62 |
| 3,970,775 A * | 7/1976 | Lemelson | 348/107 |
| 3,987,980 A * | 10/1976 | Sperry | 242/335 |
| 4,068,040 A * | 1/1978 | Yamada et al. | 428/424.4 |
| 4,139,871 A * | 2/1979 | Yoshida et al. | 360/64 |
| 4,323,844 A * | 4/1982 | Mikame | 324/212 |
| 4,616,280 A * | 10/1986 | Kobayashi et al. | 360/291.2 |
| 4,656,537 A * | 4/1987 | Toba et al. | 360/73.05 |
| 4,889,296 A * | 12/1989 | Watanabe et al. | 242/338 |
| 6,067,212 A | 5/2000 | Poorman | 360/128 |
| 6,122,128 A | 9/2000 | Byrne | 360/69 |
| 6,191,542 B1 * | 2/2001 | Chliwnyj | 318/7 |
| 6,215,618 B1 | 4/2001 | Anderson et al. | 360/128 |
| 6,282,052 B1 * | 8/2001 | Galloway et al. | 360/78.09 |
| 6,292,330 B1 | 9/2001 | Thiessen et al. | 360/128 |
| 6,590,742 B1 | 7/2003 | Yamakawa | 360/128 |
| 6,624,960 B1 | 9/2003 | Langiano et al. | 360/69 |
| 6,654,194 B1 | 11/2003 | Masuda et al. | 360/69 |
| 6,697,212 B1 * | 2/2004 | Tsuchiya | 360/95 |
| 2002/0085302 A1 | 7/2002 | Masuda et al. | 360/69 |

FOREIGN PATENT DOCUMENTS

EP             0102897 A1       3/1984

* cited by examiner

*Primary Examiner*—Fred F. Tzeng
(74) *Attorney, Agent, or Firm*—Kunzler & Associates

(57) ABSTRACT

An apparatus, system, and method are disclosed for determining brush contact with a magnetic head. A digitally generated signal is provided in a system and a first gain constant is adjusted without the brush in contact with the magnetic head until the signal achieves unity gain. A second gain constant is adjusted with the brush in contact with the magnetic head until the signal once again achieves unity gain. The difference between the first and second gain constants is calculated. If the difference satisfies a predetermined threshold, a monitoring message is provided indicating insufficient contact between the brush and the magnetic head. The message may serve to warn the user that the brush arm assembly may be inoperative or a failure message indicating that the entire brush assembly needs to be replaced.

29 Claims, 5 Drawing Sheets

APPARATUS, SYSTEM, AND METHOD FOR DETERMINING CONTACT WITH A MAGNETIC HEAD IN A TAPE DRIVE

BACKGROUND OF THE INVENTION

1. Field of the Invention

This invention relates to detecting electrical characteristics of a read head and more particularly relates to measuring the dampening of cleaning brush bristles in contact with the read head within a tape drive system.

2. Description of the Related Art

Recording and playback systems for magnetic mediums are subject to degradation during use as a result of the accumulation of debris which occurs on the magnetic transducer heads of such systems. Transducer heads include magnetic read/write heads and associated read/write elements. Hence, there is a need to periodically clean the magnetic transducer heads. Accordingly, there exist several techniques for cleaning a magnetic transducer head.

One technique utilizes a separate, dedicated "cleaning cartridge" to perform periodic cleaning of the recording transducer. A "cleaning cartridge" contains a supply of unrecorded abrasive tape that is used to clean one or more magnetic transducer heads. For example, the recording heads found on a tape drive can be cleaned with a "cleaning cartridge." In order to utilize a "cleaning cartridge," the recording or playback of the medium must be stopped, the data cartridge removed, and the "cleaning cartridge" inserted. The "cleaning cartridge" is then run within the record or playback system so as to clean the recording transducer. Once cleaning is complete, the "cleaning cartridge" is removed, and a data cartridge is reinserted. However, after the "cleaning cartridge" has been used, a new data cartridge may be loaded into the system in order to evaluate the performance of the magnetic transducer head so as to confirm that cleaning has been successfully completed.

Where magnetic recording/playback system is a tape recording/playback system, the cleaning cartridge includes an abrasive cleaning tape that can cause excessive tape head wear on the magnetic head. The abrasiveness of the cleaning tape can be adjusted in order to tailor its effectiveness. If the cleaning tape is made sufficiently effective to thoroughly remove debris, then the cleaning tape should only be used when it is necessary; otherwise, excessive magnetic head wear will result. Such a problem can occur where a piece of abrasive cleaning tape is provided as a leader on a data tape cartridge such that each time a tape is used the leader is used to clean a read/write head. Furthermore, the provision of an abrasive tape leader within a data tape cartridge eventually results in degradation of the abrasive leader from debris accumulating on the cleaning tape. If the abrasive cleaning tape is effective to thoroughly remove debris from a magnetic head, then a routine must be established to limit use of the cleaning tape only when it is necessary.

Where magnetic tape is used to store computer data, the presence of errors represents a significant problem even if the errors occur infrequently. In certain applications, the loss of data requires that a user be able to perform a cleaning operation in response to recognized drop-out errors, but does not immediately prevent use of the equipment prior to cleaning. In some cases, the loss of a single bit of computer data can be of significant importance, and recovery from such an error must be done in a manner that ensures error-free data storage and retrieval. While error correction is possible via error algorithms, data loss can still present problems to a user.

One form of magnetic storage comprises existing linear and helical scan tape drives that are used for storage and retrieval of computer data. Such tape drives use a single reel in the form of a magnetic tape cartridge to house the magnetic tape media. A special leader or leader block is attached to the magnetic tape media at one end which enables the tape drive to extract the magnetic tape from the magnetic tape cartridge.

"Tape recorder" as used herein refers to one form of magnetic recording/playback system comprising magnetic tape transcription equipment. Such equipment is understood to include standard tape recorders having fixed or movable heads, as well as accurate scan and helical scan transcription equipment as is typically used in analog and digital tape recorders. According to one implementation, a linear transcription head is employed, although the present invention has application in other tape recording environments. As described here, "transcription" is intended to mean read and/or write operations that are performed with a tape recorder, and is not intended to be limited to a particular use or format for data.

Another conventional technique is found on a typical helical scan tape drive wherein a head cleaning device is built into a mechanism of the tape drive. More particularly, a helical scan tape drive forms a recording method that is used on videotape and digital audio tape (DAT) that runs the tracks diagonally from top to bottom in order to increase the storage capacity. A drum containing read/write heads is used to read/write information in diagonal segments from/onto a segment of magnetic tape. A head cleaner is located on an opposite side of the drum than the tape. In this manner, while data is being written/read, the head cleaner can be concurrently cleaning the heads as they pass by on the drum.

One linear tape drive which does have a head cleaner built into the tape drive mechanism is the International Business Machines (IBM) Magstar 3590. The IBM Magstar 3590 has a cleaning brush built into the tape drive mechanism such that the cleaning brush is brought into contact with the read/write heads during a tape threading operation. More particularly, as a leader block on a data tape is pulled back into the tape cartridge, the leader block triggers a lever which engages the brush against the read/write heads. An actuator moves the heads up and down in order to provide scrubbing action between the brush and heads. Generally, there is not a way to determine how well the brush is operating without removing physically examining the brush. In certain tape drives a switch is attached at the arm of the brush to provide notification to a user that the brush may be inoperative. However, the switch does not detect the quality of connection or contact between the brush and the heads. For example, if the bristles on the brush were non-existent, the switch would not detect this error as long as the brush arm activated at the appropriate time.

From the foregoing discussion, it should be apparent that a need exists for an apparatus, system, and method that determines contact between a brush and magnetic head(s) without additional hardware being required. Additionally, the need exists for an apparatus, system, and method that possesses the increased ability to measure the contact of the brush bristles against the magnetic head during a cleaning operation. Beneficially, such an apparatus, system, and method would allow a user to configure a contact threshold that, if satisfied, the user is notified that a brush and/or brush arm is inoperative and needs to be replaced.

SUMMARY OF THE INVENTION

The present invention has been developed in response to the present state of the art, and in particular, in response to the problems and needs in the art that have not yet been fully solved by currently available data tape drives. Accordingly, the present invention has been developed to provide an apparatus, system, and method for determining brush contact with a magnetic head that overcome many or all of the above-discussed shortcomings in the art.

The apparatus to determine brush contact is provided with a logic unit containing a plurality of modules configured to functionally execute the necessary steps of determining the brush contact with the magnetic head. These modules in the described embodiments include a measurement module configured to measure a first gain constant in a servo loop with a brush not in contact with a magnetic head and a second gain constant in the servo loop with the brush in contact with the magnetic head. The servo loop automatically regulates a quantity, such as the output of an electrical signal, as a function of variations in another quantity, such as the input to the electrical signal. The first gain constant may be adjusted to regulate the input until it is identical to the output. When the brush engages the magnetic head, the input will typically not remain identical to the output.

The second gain constant may be adjusted to regulate the input after the brush engages the magnetic head until the input is again identical to the output. A comparison module is configured to calculate a difference between the first gain constant and the second gain constant. A log module is configured to log incomplete contact between the brush and the magnetic head if the difference between the first and second gain constants does not satisfy a predetermined threshold. The measurement module is further configured to measure the first gain constant and the second gain constant over a plurality of electrical frequencies. In other words, the frequency regulating the input to the servo loop may vary. Similarly, the comparison module is further configured to calculate a difference between the first gain constant and the second gain constant over a plurality of electrical frequencies.

The apparatus further comprises a notification module configured to report a monitoring message. The monitoring message may include the status of the contact between the brush and the magnetic head and may be reported to a user by displaying the message on a computer screen. The user may specify a warning value representing a warning magnitude. The notification module is further configured to report a warning message in response to the difference between the first and second gain constants exceeding the predetermined threshold by the warning magnitude. The user may further specify a failure value representing a failure magnitude. The notification module is further configured to report a failure message in response to the difference between the first and second gain constants exceeding the predetermined threshold by the failure magnitude.

The measurement module is further configured to measure a servo loop displacement as the brush brushes against a magnetic head. The servo loop displacement represents the variation in the input to the servo loop as the brush brushes against the magnetic head. The log module is further configured to log incomplete contact between the brush and the magnetic head in response to the servo loop displacement satisfying a predetermined threshold. The measurement module is also configured to measure the servo loop displacement from a unity gain servo loop. The unity gain servo loop represents a servo loop with the input identical to the output. The measurement module may also measure the servo loop displacement as the brush sweeps across the magnetic head or as the magnetic head sweeps across the brush. The notification module is further configured to report a monitoring message in response to the servo loop displacement exceeding the predetermined threshold.

A system of the present invention is also presented to determine brush contact with a magnetic head. The system may include a tape drive assembly configured to manage movement of a tape from a tape cartridge, a controller configured to receive input/output operations to perform a servo loop calibration. The servo loop calibration comprises of adjusting the first gain constant until the input and output of the servo loop are identical. The system may further include a magnetic head assembly configured to control movement of a magnetic head in order to perform the input/output operations and a brush assembly configured to place a brush in contact with the magnetic head. The system of the present invention may further include a memory device comprising a measurement module configured to measure a first gain constant in a servo loop with the brush not in contact with the magnetic head and a second gain constant in the servo loop with the brush in contact with the magnetic head, a comparison module configured to calculate a difference between the first gain constant and the second gain constant, and a log module configured to log incomplete contact between the brush and the magnetic head in response to the difference satisfying a predetermined threshold.

The controller is further configured to report a monitoring message. The monitoring message may be reported to a user by displaying a message on a computer screen. The monitoring message may include the status of the contact between the brush and the magnetic head. The controller is further configured to report a warning message in response to the difference between the first and second gain constants exceeding the predetermined threshold by a warning magnitude. The controller is also configured to report a failure message in response to the difference exceeding the predetermined threshold by a failure magnitude.

A method of the present invention is also presented for determining brush contact with a magnetic head. The method in the disclosed embodiments substantially includes the steps necessary to carry out the functions presented above with respect to the operation of the described apparatus and system. In one embodiment, the method includes measuring a first gain constant in a servo loop with a brush not in contact with a magnetic head, measuring a second gain constant in the servo loop with the brush in contact with the magnetic head, calculating a difference between the first gain constant and the second gain constant, and logging incomplete contact between the brush and the magnetic head in response to the difference satisfying a predetermined threshold. The method may further include measuring the first and second gain constants in a plurality of electrical frequencies and calculating the difference between the first and second gain constants in a plurality of electrical frequencies.

In a further embodiment, the method includes reporting a monitoring message including the status of the contact between the brush and the magnetic head. The method further includes reporting a warning message in response to the difference exceeding the predetermined threshold by a warning magnitude and reporting a failure message in response to the difference exceeding the predetermined threshold by a failure magnitude.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
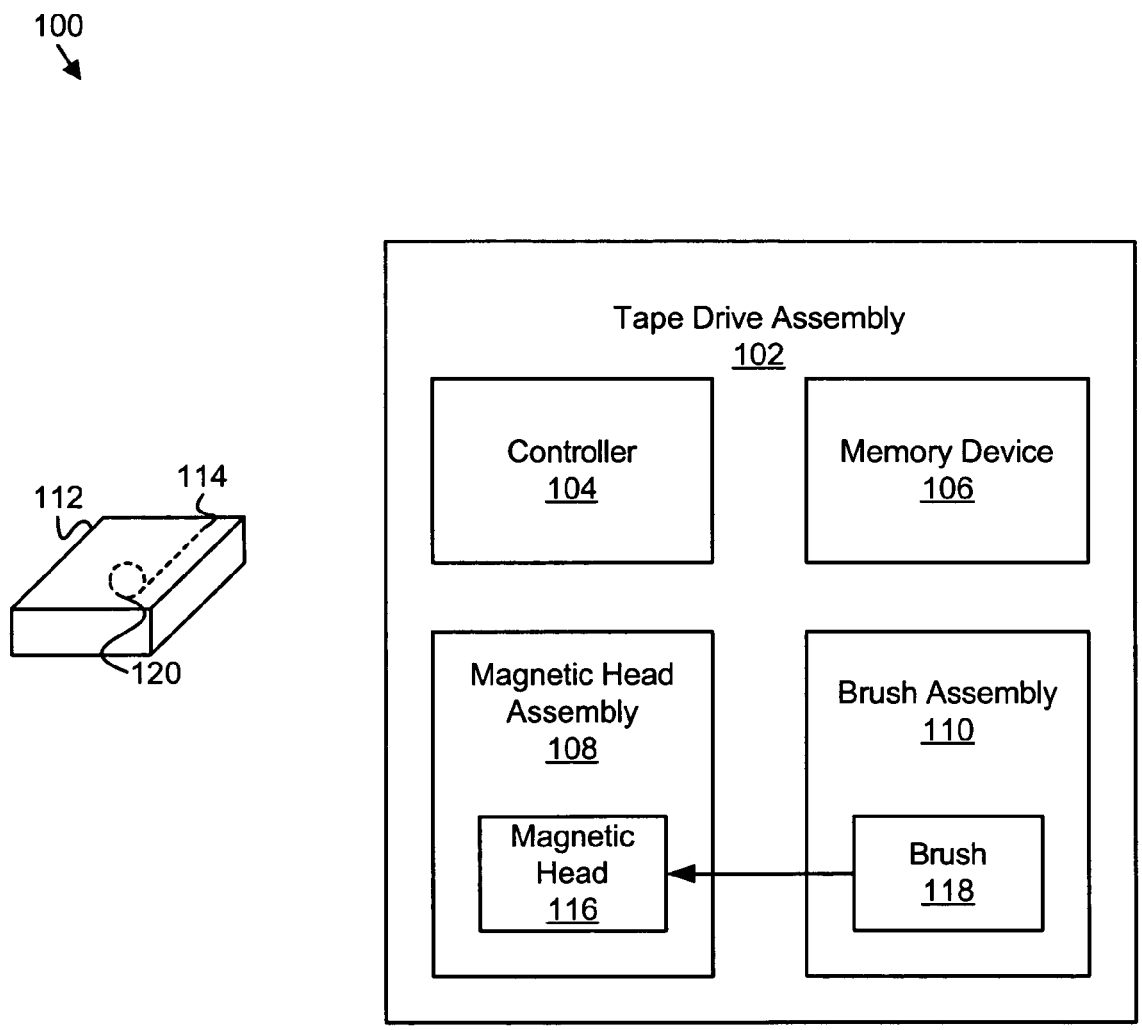
FIG. 1 is a schematic block diagram illustrating a tape drive assembly suitable for use with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 illustrates a tape drive environment 100 including a tape drive assembly 102 suitable for implementing the present invention. In one embodiment, the tape drive assembly 102 is a linear recording tape drive. Certain aspects of the invention can be used in connection with other magnetic storage media, for storing either analog or digital information. Some aspects of the invention may be employed, for example, in connection with any of a variety of types of storage devices having read/write heads, including linear, helical and serpentine tape drives. For purposes of illustration, the invention will be described in connection with a computer linear tape drive such as the illustrated tape drive assembly 102.

As shown in FIG. 1, the tape drive assembly 102 may be used with tape cartridges such as a tape cartridge 112. In the illustrated embodiment, the tape cartridge 112 is a single-reel type linear tape cartridge. Such tape cartridge 112 includes a tape carrier in the form of a reel 120, and a tape 114 wound onto the reel 120. A second reel (not shown) is included in the tape drive assembly 102, and is configured to engage the tape 114. The second reel cooperates with the first reel 120 to form a tape carrier. In an alternative embodiment, the tape cartridge 112 includes two reels.

In one embodiment, the tape 114 is configured with a width, W, of one-half inch. The tape 114 also has a length extending in a direction perpendicular to width W, with a plurality of parallel tracks being defined across the width of the tape 114. The tracks extend in the direction of the length of the tape 114, and are used for storing data as well as storing servo information.

The illustrated tape drive assembly 102 includes a controller 104, a memory device 106, a magnetic head assembly 108, and a brush assembly 110. The magnetic head assembly 108 further includes a magnetic head 116. The magnetic head 116 contains a plurality of read/write elements (not shown) for reading data from or writing data to the tape 114 of the data cartridge 112. Additionally, the magnetic head 108 further contains a plurality of servo elements (not shown) for reading/writing servo code from the tape 114. Additionally, such servo elements on the magnetic head 116 are configured for reading/writing servo information as well as data from a portion of the tape 114.

The brush assembly 110 includes a brush 118 that may be positioned directly against the magnetic head 116. In one embodiment, the brush 118 is formed from a statically dissipative, slightly conductive bristle material. One such bristle material comprises a reasonably conductive and soft nylon brush. In a second embodiment, a conductive carbon material may be utilized to form the cleaning brush 118. Further, stainless steel may be utilized to form the cleaning brush 118.

The magnetic head 116 may be actuated by a motor (not shown) for up-and-down movement, transverse to the travel direction of the tape 114, such that a cleaning action is imparted between the brush 118 and the magnetic head 116. In a further embodiment, the brush 118 is oscillated one to two times per second while engaged with the magnetic head 116.

Current linear tape drives, as depicted in FIG. 1, may contain a mechanical switch (not shown) that monitors the actuation of the brush 118. The switch may record an error message if the brush 118 does not actuate properly. In other words, an error message may be recorded when the brush fails to move from a storage position to a contact position near the magnetic head 116. The controller 104 may provide the error message to a user. However, linear tape drives with this switch technology only provide error messages when the brush 118 does not actuate, and do not provide error messages if the brush 118 is not in contact with the magnetic head 116. For example, if the brush 118 actuates, the switch may not record an error message even though the brush may not be engaged with the magnetic head 116 in the proper manner.

Figure 2:
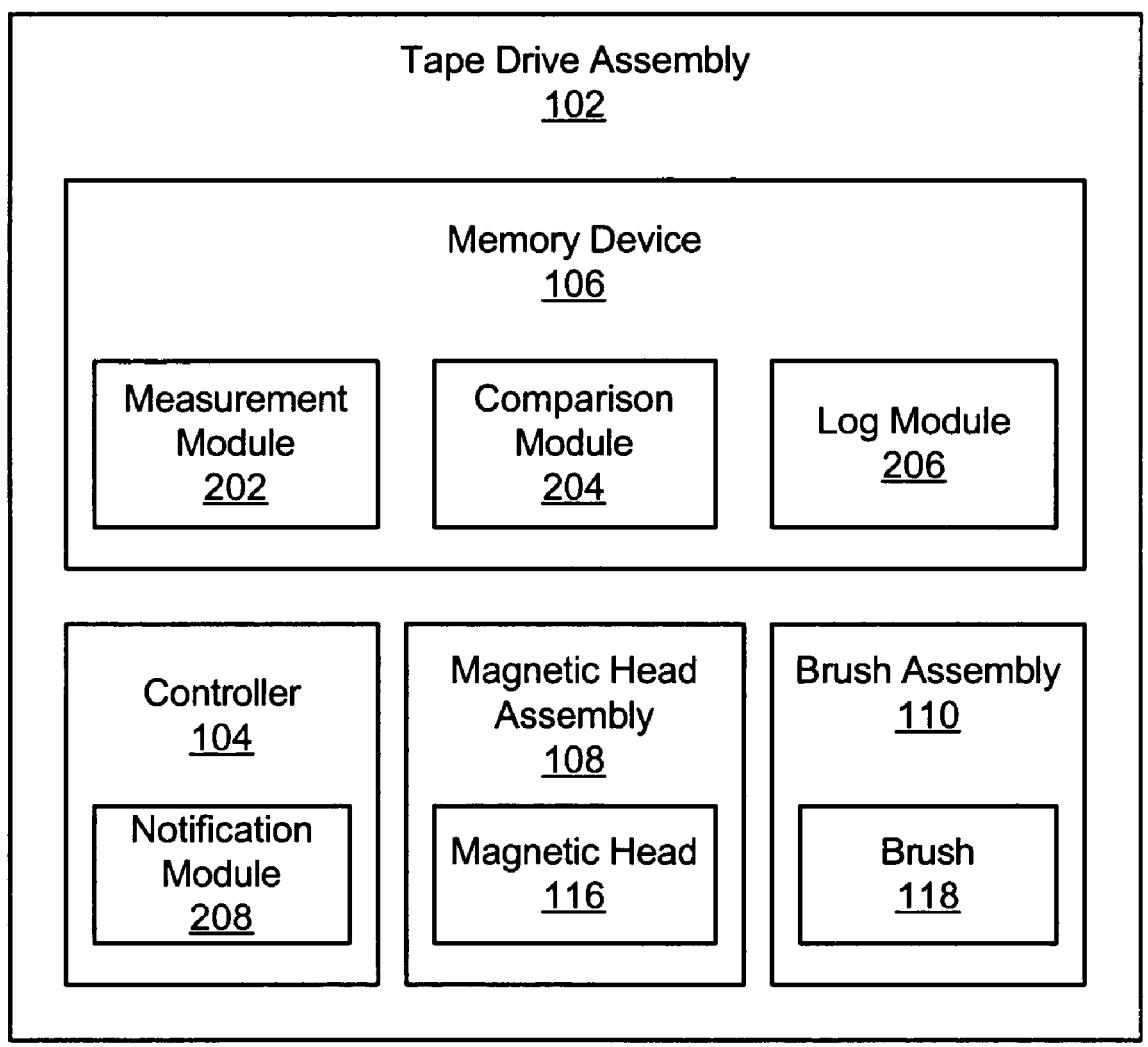
FIG. 2 is a simplified schematic block diagram illustrating a tape drive assembly in accordance with the present invention.

FIG. 2 is a schematic block diagram illustrating a detailed description of certain components comprising the tape drive assembly 102 of FIG. 1 that facilitate determining if a brush, such as the brush 118, is engaging the magnetic head 116 correctly. The memory device 106 includes a measurement module 202, a comparison module 204, and a log module 206.

The measurement module 202 is configured to measure a first gain constant in a servo loop with the brush 118 not in contact with the magnetic head 116. The servo loop automatically regulates a quantity, such as the output of an electrical signal, as a function of variations in another quantity, such as the input to the electrical signal. Input to the signal may include electricity, noise, energy, and the like. In one embodiment, the electrical signal is a sine wave. The first gain constant may be adjusted to regulate the input so that it is identical to the output. The uniformity of the input and the output provides a signal with unity gain.

The measurement module 202 is further configured to measure a second gain constant in the servo loop after the brush 118 actuates and engages the magnetic head 116. In other words, after the brush 118 comes into contact with the magnetic head 116, the input of the signal will vary from the output and the unity gain achieved by adjusted the first gain constant will cease. The second gain constant may be adjusted to regulate the input caused by the contact of the brush 118 against the magnetic head 116 so that the input is identical to the output and unity gain is again achieved. In one embodiment, the measurement module 202 measures the first and second gain constants in a servo loop for the magnetic head 116. In another embodiment, the measurement module 202 measures the first and second gain constants in a servo loop for the brush 118. The measurement module 202 may be further configured to measure the first and second gain constants over a plurality of electrical frequencies. For example, the measurement module 202 may measure the first gain constant at a specific frequency and then subsequently measure the first gain constant at a different frequency without the brush 118 in contact with the magnetic head 116. Similarly, the measurement module 202 may measure the second gain constant with the brush 118 engaged against the magnetic head 116 at a specific frequency and then subsequently measure the second gain constant at a different electrical frequency.

The measurement module 202 may also measure a servo loop displacement as the brush 118 sweeps across the magnetic head 116. The servo loop displacement may indicate the displacement the input achieves due to the brush 118 sweeping across the magnetic head 116 from the input of a signal with unity gain. In one embodiment, the measurement module 202 measures the servo loop displacement as the magnetic head 116 remains stationary and the brush 118 engages in a sweeping action across the surface of the magnetic head 116. In another embodiment, the measurement module 202 measures the servo loop displacement as the brush 118 remains stationary and the magnetic head 116 engages in a sweeping action across the brush 118.

The comparison module 204 calculates a difference between the first and second gain constants. If the difference between the first and second gain constants yields a negative value, the comparison module 204 calculates the absolute value of the difference. The comparison module 204 may also calculate the difference between the first and second gain constants over a plurality of electrical frequencies as previously described. The log module 206 logs incomplete contact between the brush 118 and the magnetic head 116 if the value representing the difference between the first and second gain constants satisfy a predetermined threshold. In other words, a user may specify a threshold value, and if the difference between the first and second gain constants exceeds the predetermined threshold, the log module 206 logs incomplete contact. In another embodiment, the log module 206 may log incomplete contact between the brush 118 and the magnetic head 116 if the difference does not exceed the predetermined threshold. Incomplete contact may include the brush 118 not engaging the magnetic head 116 with a sufficient amount of pressure to sufficiently perform a cleaning action against the magnetic head 116.

The controller 104 as described in FIG. 1 includes a notification module 208. The notification module 208 facilitates reporting a monitoring message describing the functionality of the brush 118. The monitoring message may be reported to a user and may include the operating status of the brush 118. In one embodiment, the notification module 208 reports a warning message in response to the difference between the first and second gain constants exceeding the predetermined threshold by a warning magnitude. A user may determine a threshold value representing the warning magnitude. The notification module 208 may report the warning message by sending the message to a user through email or displaying the warning message on a computer screen.

In another embodiment, the notification module 208 reports a failure message by sending the message to a user by email or displaying the failure message on a computer screen in response to the difference between the first and second gain constants exceeding the predetermined threshold by a failure magnitude. A user may also determine a threshold value representing the failure magnitude. In a further embodiment, the notification module 202 reports monitoring message in response to the servo loop displacement exceeding the predetermined threshold The following schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
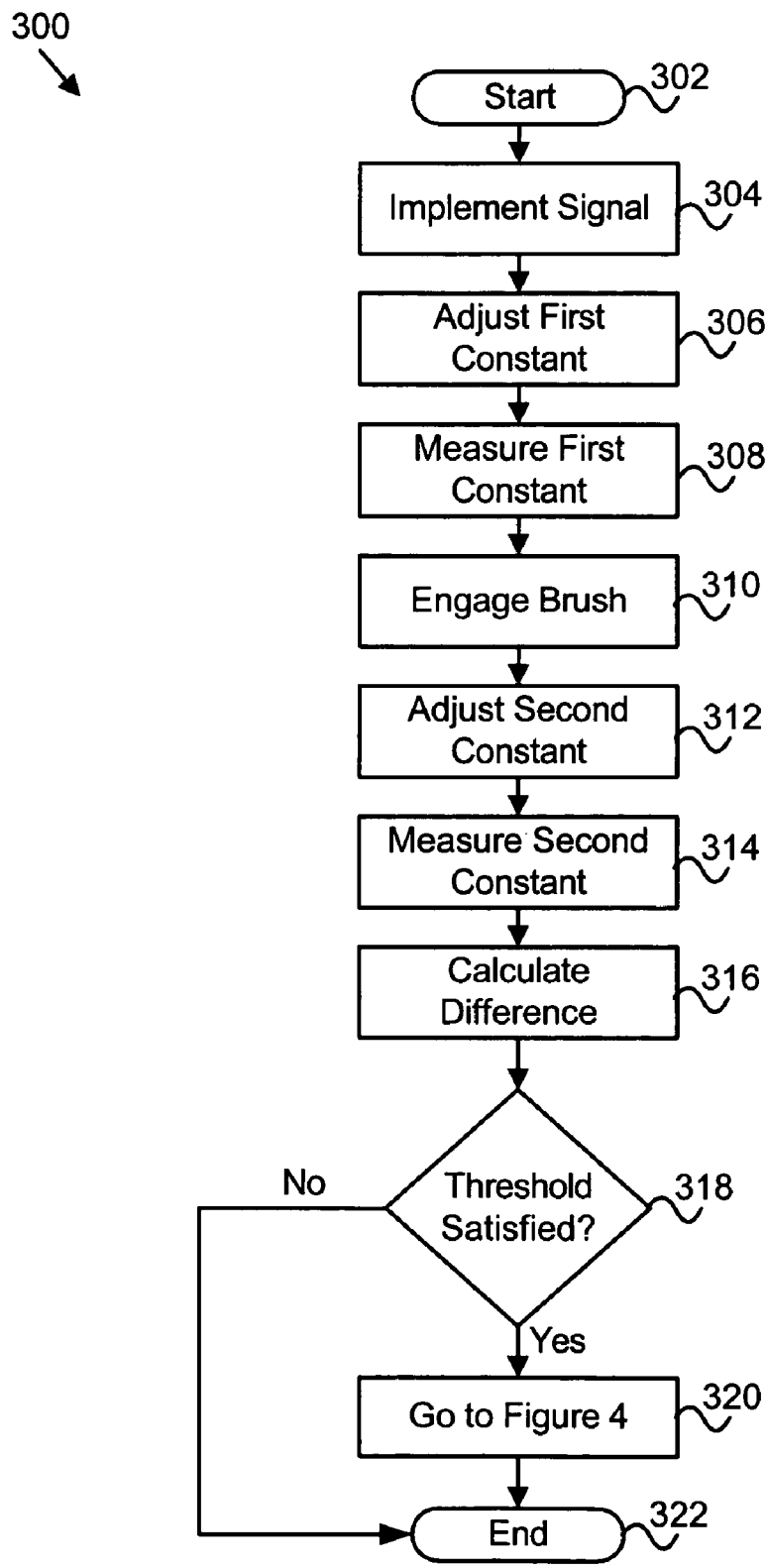
FIG. 3 is a schematic flow chart illustrating an open loop contact method in accordance with the present invention.

FIG. 3 is a schematic flow chart diagram illustrating an open loop contact method 300 that facilitates determining brush contact with a magnetic head in an open loop environment. The open loop environment may include a signal, such as a sine wave, that is controlled directly, and only by an input signal such as electricity, energy, noise, and the like. The method 300 may be used in accordance with the present invention and the above-mentioned figures.

The method 300 starts 302 and a signal is implemented 304. In one embodiment, the controller 104 implements a sine wave by displaying a sine wave to a user. A first gain constant associated with the signal is adjusted 306. The first gain constant is adjusted until the signal achieves unity gain. The first gain constant is measured 308. In one embodiment, the measurement module 202 measures 308 the first gain constant. The method 300 continues and a brush 118, is engaged 310. In one embodiment, the brush 118 is engaged 310 against a magnetic head 116. Once the brush 118 is in contact with the magnetic head 116, the signal typically does not achieve unity gain using the first gain constant. A second gain constant is adjusted 312 until the implemented signal once again achieves unity gain. In one embodiment, the measurement module 202 measures 314 the second gain constant. The comparison module 204 calculates 316 the difference between the first and second gain constants.

Figure 4:
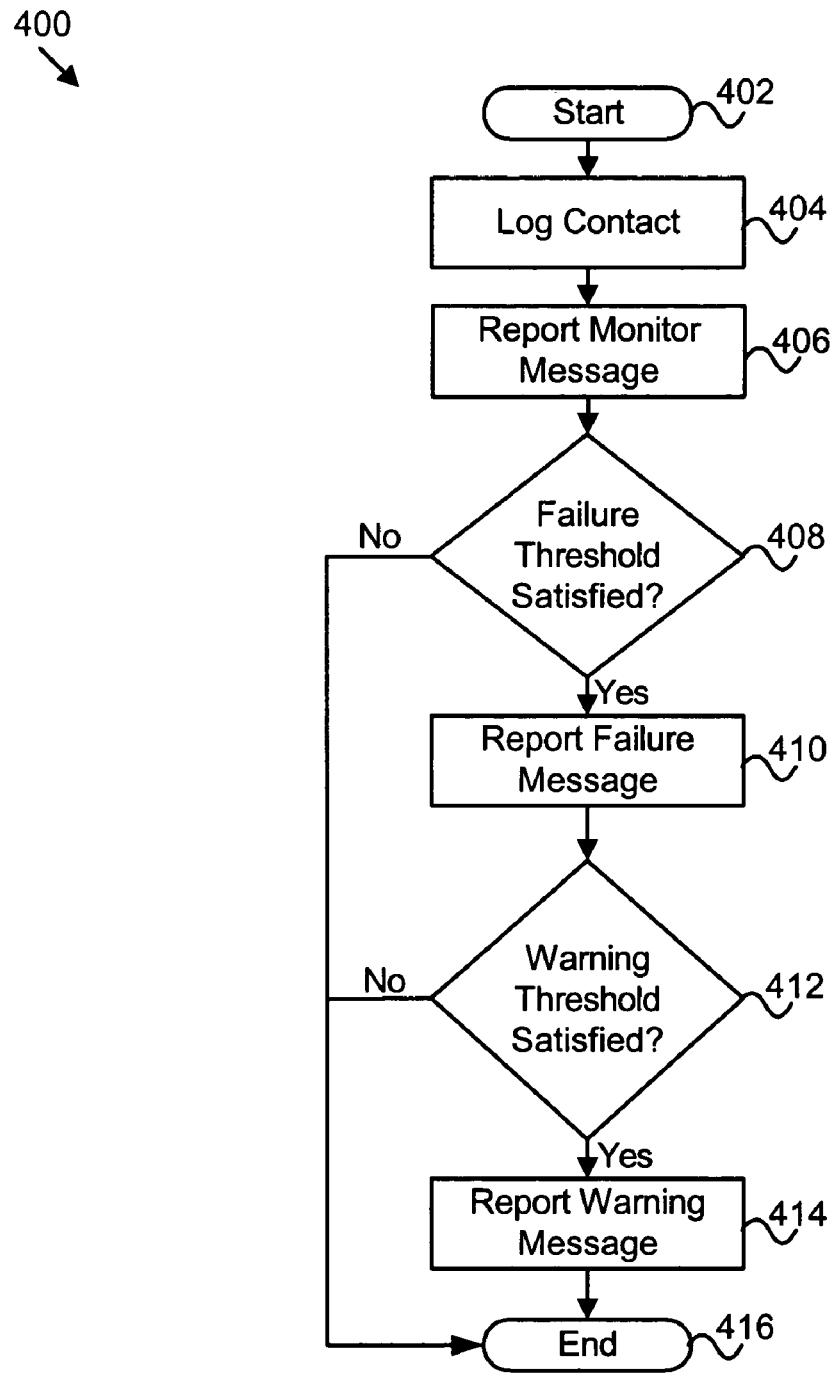
FIG. 4 is a schematic flow chart illustrating a message report method in accordance with the present invention.

The method 300 continues and if the difference between the first and second constants satisfies 318 a predetermined threshold, the method 300 proceeds 320 to the method steps of FIG. 4. If the difference between the first and second constants does not satisfy 318 the predetermined threshold, the method 300 ends 322.

FIG. 4 is a schematic flow chart illustrating a message report method 400 that facilitates reporting a message describing the functionality of a brush 118 used to engage a magnetic head 116. The method 400 starts 402 and the log module 206 logs 404 an incomplete contact message between the brush 118 and the magnetic head 116. In one embodiment, the notification module 208 reports 406 a monitor message to a user that includes the incomplete contact message logged 404 by the log module 206. The monitor message may be displayed to a user on a computer screen.

Next, a determination 408 is made whether the difference between the first and second gain constants or alternatively a servo loop displacement exceeds 412 a predetermined threshold by a failure magnitude. If so, the notification module 208 reports 410 a failure message. In one embodiment, the failure message may include a warning that the brush 118 is not engaging the magnetic head 116 and the brush assembly 110 is inoperative.

Next, a determination 412 is made whether the difference between the first and second gain constants or alternatively servo loop displacement exceeds 408 a predetermined threshold by a warning magnitude, a warning message is reported 414. In one embodiment, the warning message may include a warning to a user that the brush 118 is not fully engaging the magnetic head 116 correctly. If the difference or servo loop displacement does not exceed the predetermined threshold by a warning magnitude, the method ends 416.

Figure 5:
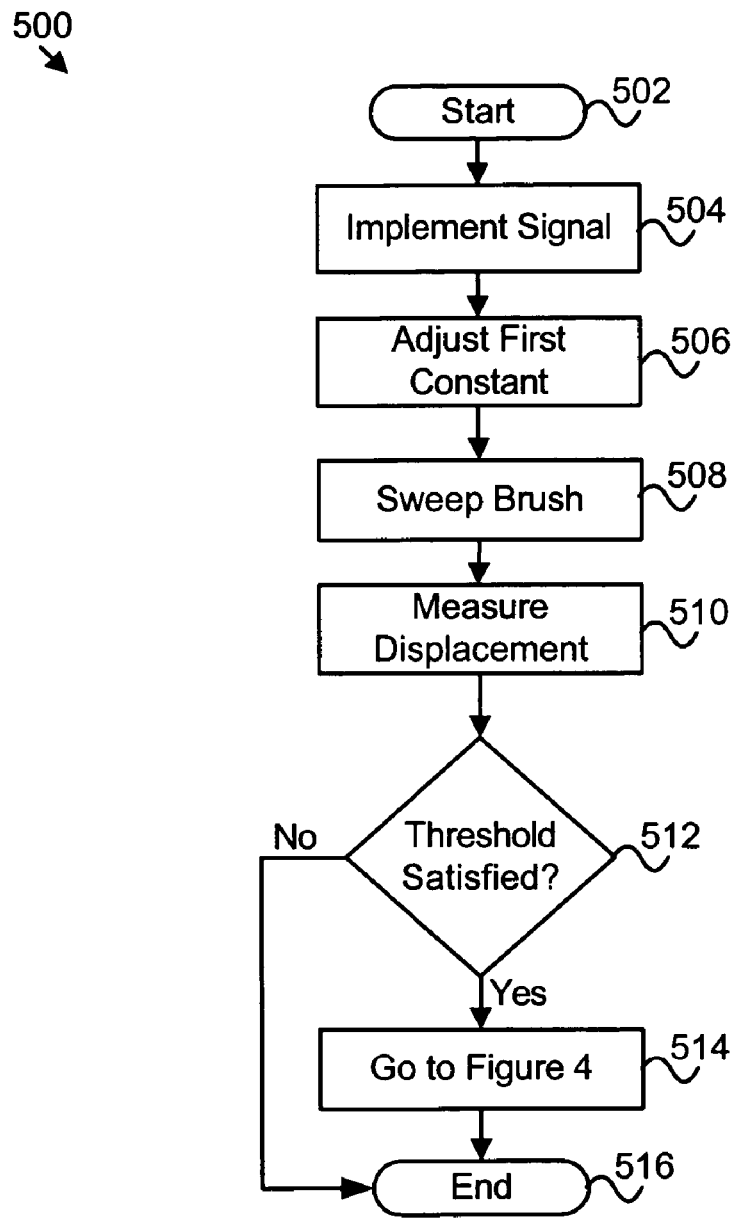
FIG. 5 is a schematic flow chart diagram illustrating one embodiment of a closed loop contact method in accordance with the present invention.

FIG. 5 is a schematic flow chart diagram illustrating a closed loop contact method 500. A closed loop may include a signal that automatically makes corrections if the output, such as the gain produced when the brush 118 engages the magnetic head 116, is not the desired output, such as unity gain. The method 500 facilitates determining the contact between a brush 118 and a magnetic head 116 in a closed loop environment.

The method 500 starts 502 and the controller 104 implements 504 a signal. In one embodiment, the signal may include a sine wave and may be implemented by the controller 104. In one embodiment, the controller 104 implements a sine wave by displaying the since wave to a user. The user may adjust 506 a first gain constant until the implemented signal achieves unity gain and is calibrated. The brush 118 is actuated and swept across 508 a stationary magnetic head 116. In another embodiment, the magnetic head 116 is swept across 508 a stationary brush 118. The sweeping of the brush 118 across the magnetic head 116 causes a displacement from unity gain. The displacement, also referred to as a servo loop displacement, is measured 510 as the brush 118 sweeps 508 across the magnetic head 116. The servo loop displacement may be a value of distance from the signal with unity gain. If the servo loop displacement satisfies 512 a predetermined threshold, the method 500 proceeds to the method steps described in FIG. 4. If the servo loop displacement does not satisfy 512 the predetermined threshold, the method 500 ends 516.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus to determine brush contact with a magnetic head, the apparatus comprising:

a measurement module configured to measure a first gain constant in a servo loop with a brush not in contact with a magnetic head and a second gain constant in the servo loop with the brush in contact with the magnetic head;
a comparison module configured to calculate a difference between the first gain constant and the second gain constant; and
a log module configured to log incomplete contact between the brush and the magnetic head in response to the difference satisfying a predetermined threshold.

2. The apparatus of claim 1, further comprising a notification module configured to report a monitoring message.

3. The apparatus of claim 2, wherein the notification module is further configured to report a warning message in response to the difference exceeding the predetermined threshold by a warning magnitude.

4. The apparatus of claim 2, wherein the notification module is further configured to report a failure message in response to the difference exceeding the predetermined threshold by a failure magnitude.

5. The apparatus of claim 1, wherein the measurement module is further configured to measure the first gain constant and the second gain constant over a plurality of electrical frequencies.

6. The apparatus of claim 1, wherein the comparison module is further configured to calculate a difference between the first gain constant and the second gain constant over a plurality of electrical frequencies.

7. An apparatus to determine brush contact with a magnetic head, the apparatus comprising:
a measurement module configured to measure a servo loop displacement as a brush brushes against a magnetic head; and
a log module configured to log incomplete contact between the brush and the magnetic head in response to the servo loop displacement satisfying a predetermined threshold, wherein the measurement module is further configured to measure the servo displacement from a unity gain servo loop.

8. The apparatus of claim 7, wherein the measurement module is further configured to measure the servo loop displacement as the brush sweeps across the magnetic head.

9. The apparatus of claim 7, wherein the measurement module is further configured to measure the servo loop displacement as the magnetic head sweeps across the brush.

10. The apparatus of claim 7, further comprising a notification module configured to report a monitoring message in response to the servo loop displacement exceeding the predetermined threshold.

11. A system to determine brush contact with a magnetic head, the system comprising:
a tape drive assembly configured to manage movement of a tape from a tape cartridge;
a controller configured to receive input/output operations and perform a servo loop calibration;
a magnetic head assembly configured to control movement of a magnetic head in order to perform the input/output operations;
a brush assembly configured to place a brush in contact with the magnetic head; and
a memory device comprising,
a measurement module configured to measure a first gain constant in a servo loop with the brush not in contact with the magnetic head and a second gain constant in the servo loop with the brush in contact with the magnetic head;
a comparison module configured to calculate a difference between the first gain constant and the second gain constant; and
a log module configured to log incomplete contact between the brush and the magnetic head in response to the difference satisfying a predetermined threshold.

12. The system of claim 11, wherein the controller is further configured to report a monitoring message.

13. The system of claim 12, wherein the controller is further configured to report a warning message in response to the difference exceeding the predetermined threshold by a warning magnitude.

14. The system of claim 12, wherein the controller is further configured to report a failure message in response to the difference exceeding the predetermined threshold by a failure magnitude.

15. The system of claim 11, wherein the measurement module is further configured to measure the first gain constant and the second gain constant over a plurality of electrical frequencies.

16. The system of claim 11, wherein the comparison module is further configured to calculate a difference between the first gain constant and the second gain constant over a plurality of electrical frequencies.

17. A signal bearing medium tangibly embodying a program of machine-readable instructions executable by a digital processing apparatus to perform operations to determine brush contact with a magnetic head, the operations comprising:
an operation to measure a first gain constant in a servo loop with a brush not in contact with a magnetic head;
an operation to measure a second gain constant in the servo loop with the brush in contact with the magnetic head;
an operation to calculate a difference between the first gain constant and the second gain constant; and
an operation to log incomplete contact between the brush and the magnetic head in response to the difference satisfying a predetermined threshold.

18. The signal bearing medium of claim 17, further comprising an operation to report a monitoring message.

19. The signal bearing medium of claim 18, wherein the operation further comprises an operation to report a warning message in response to the difference exceeding the predetermined threshold by a warning magnitude.

20. The signal bearing medium of claim 18, wherein the operation further comprises an operation to report a failure message in response to the difference exceeding the predetermined threshold by a failure magnitude.

21. The signal bearing medium of claim 17, further comprising an operation to measure the first gain constant and the second gain constant over a plurality of electrical frequencies.

22. The signal bearing medium of claim 17, further comprising an operation to calculate a difference between the first gain constant and the second gain constant over a plurality of electrical frequencies.

23. A method for determining brush contact with a magnetic head, the method comprising:
measuring a first gain constant in a servo loop with a brush not in contact with a magnetic head;
measuring a second gain constant in the servo loop with the brush in contact with the magnetic head;
calculating a difference between the first gain constant and the second gain constant; and logging incomplete contact between the brush and the magnetic head in response to the difference satisfying a predetermined threshold.

24. The method of claim 23, further comprising reporting a monitoring message.

25. The method of claim 24, wherein the method further comprises reporting a warning message in response to the difference exceeding the predetermined threshold by a warning magnitude.

26. The method of claim 24, wherein the method further comprises reporting a failure message in response to the difference exceeding the predetermined threshold by a failure magnitude.

27. The method of claim 23, further comprising measuring the first gain constant and the second gain constant in a plurality of electrical frequencies.

28. The method of claim 23, further comprising calculating the difference between the first gain constant and the second gain constant in a plurality of electrical frequencies.

29. An apparatus to determine brush contact with a magnetic head, the apparatus comprising:
- means for measuring a first gain constant in a servo loop with a brush not in contact with a magnetic head;
- means for measuring a second gain constant in the servo loop with the brush in contact with the magnetic head;
- means for calculating a difference between the first gain constant and the second gain constant; and
- means for logging incomplete contact between the brush and the magnetic head in response to the difference satisfying a predetermined threshold.

* * * * *